(12) United States Patent
Lafalce

(10) Patent No.: US 6,910,495 B2
(45) Date of Patent: Jun. 28, 2005

(54) BACKFLOW PREVENTION SYSTEM

(76) Inventor: Anthony P. Lafalce, 1261 E. Avenida Fresca, Casa Grande, AZ (US) 85222

( * ) Notice: Subject to any disclaimer, the term of this patent is extended or adjusted under 35 U.S.C. 154(b) by 0 days.

(21) Appl. No.: 10/774,170

(22) Filed: Feb. 5, 2004

(65) Prior Publication Data

US 2004/0154659 A1 Aug. 12, 2004

Related U.S. Application Data

(60) Provisional application No. 60/445,200, filed on Feb. 6, 2003.

(51) Int. Cl.[7] .............................................. F16K 13/00
(52) U.S. Cl. ...................... 137/218; 137/299; 137/614.2
(58) Field of Search ................................. 137/218, 299, 137/614.2

(56) References Cited

U.S. PATENT DOCUMENTS

| | | | |
|---|---|---|---|
| 1,601,993 A | * | 10/1926 | Blake .......................... 137/299 |
| 2,083,319 A | | 6/1937 | Davlet |
| 3,017,896 A | * | 1/1962 | Papacek .................. 137/614.2 |
| 3,980,097 A | | 9/1976 | Ellis |
| 4,483,361 A | | 11/1984 | Jungbert, Sr. |
| 4,518,006 A | | 5/1985 | Hoffman et al. |
| 4,651,772 A | | 3/1987 | Carlin |
| 5,031,661 A | | 7/1991 | Feuz |
| 5,813,428 A | | 9/1998 | Almasy et al. |
| 6,532,986 B1 | | 3/2003 | Dickey et al. |
| 6,561,214 B2 | | 5/2003 | Heil |

* cited by examiner

Primary Examiner—Gerald A. Michalsky
(74) Attorney, Agent, or Firm—Stoneman Law Offices, Ltd.; Martin L. Stoneman; Benjamin K. Erlick (57) ABSTRACT

A backflow prevention system that helps prevent contamination of potable water distribution systems from backflow at fire hydrant connections.

36 Claims, 3 Drawing Sheets

BACKFLOW PREVENTION SYSTEM

CROSS-REFERENCE TO RELATED APPLICATION

The present application claims the benefit of provisional application serial No. 60/445,200 filed Feb. 6, 2003, entitled "PROPOSAL FOR BACK-FLOW PREVENTION DEVICES ON FIRE HYDRANTS AND FIRE DEPARTMENT APPARATUS", the contents of which are incorporated herein by this reference and are not admitted to be prior art with respect to the present invention by the mention in this cross-reference section.

BACKGROUND

This invention relates to providing a backflow prevention system for improved protection of municipal water distribution systems. More particularly this invention relates to providing a fire hydrant backflow prevention system.

Usually when firefighters need to supply a fire truck with extra water to fight a fire they connect a supply fire hose from the fire truck to a fire hydrant. However, it is sometimes necessary for fire fighters to obtain water from other water sources. It is not uncommon for firemen to draw water from swimming pools, mucky ponds, irrigation canals, and other unsanitary sources, especially in rural areas. Fire trucks may also draw water from fire hydrants connected to "brown water" and "gray water" reclaimed/non-potable water distribution systems (such as, for example, reclaimed water distribution systems used to irrigate golf courses, etc.). The same fire truck may then later connect to a fire hydrant of a potable water distribution system. Although water pressure from such a potable water distribution usually keeps contamination from entering the potable water distribution system, sometimes backflow conditions can occur which can result in contaminated water entering the potable water distribution system from the supply fire hose and fire truck water tank.

Further, fire fighters often add foaming agents and other chemicals to the water in the fire truck to assist in fighting fires. These chemicals can also contaminate potable water systems if backflow conditions occur when a fire truck is connected to a fire hydrant of a potable water distribution system.

Typically fire engine tanks are not disinfected before being attached to potable water distribution systems. If contaminated water backflows from a fire hose into a potable water system people drinking water from the system could suffer adverse effects from the health hazard of the contaminated water.

Even further, fire fighters aren't the only ones that draw water from fire hydrants potentially contaminating potable water distribution systems via backflow at fire hydrants. Others draw water from fire hydrants for a variety of uses (such as, for example, construction). Most municipalities usually require that commercial users drawing water from fire hydrants use a portable backflow prevention device; however not everyone complies with these requirements. In fact, it is not uncommon for people to illegally connect to fire hydrants to steal water from the potable water distribution system, and these people are unlikely to use a backflow prevention device. Such users drawing water from fire hydrants run the risk of introducing contaminants to the potable water distribution system.

OBJECTS AND FEATURES OF THE INVENTION

A primary object and feature of the present invention is to provide a backflow prevention system that helps solve the above problems and helps reduce the above risks of contamination from backflow.

It is a further object and feature of the present invention to provide such a backflow prevention system that helps prevent contamination of potable water distribution systems from backflow at fire hydrant connections.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a fire hydrant system, relating to protecting the purity of potable water systems from contamination from frangible-barrel-fire-hydrant use, comprising, in combination: at least one frangible barrel fire hydrant comprising at least one upper barrel body at least one lower barrel body, at least one frangible plane between such at least one upper barrel body and such at least one lower barrel body, at least one water outlet chamber, extending from such at least one upper barrel body, and at least one water entry into such at least one water outlet chamber from such at least one upper barrel body; wherein such at least one upper barrel body and such at least one water outlet chamber together comprise exactly one unitary-construction housing; at least one water-flowable channel extending from within such at least one upper barrel body, through such at least one water entry, and through such at least one water outlet chamber; and at least one backflow preventer situate within such exactly one unitary-construction housing; wherein such at least one backflow preventer is adapted to assist prevention of backflow of water through such at least one entry. Moreover, it provides such a fire hydrant system wherein such at least one backflow preventer comprises at least one valve disc. Additionally, it provides such a fire hydrant system wherein such at least one valve disc of such at least one backflow preventer, when closed, is located adjacent such at least one water entry. Also, it provides such a fire hydrant system wherein such at least one water outlet chamber comprises at least one fire hose-connectable water outlet. In addition, it provides such a fire hydrant system wherein such at least one water outlet chamber comprises at least two fire hose-connectable water outlets. And, it provides such a fire hydrant system wherein such at least two hose-connectable water outlets comprise water outlets adapted to at least two different hose diameters. Further, it provides such a fire hydrant system wherein such at least one backflow preventer is located adjacent such at least one water entry. A fire hydrant system, relating to protecting the purity of potable water systems from contamination from frangible-barrel-fire-hydrant use, comprising, in combination: at least one frangible barrel fire hydrant comprising at least one upper barrel body at least one lower barrel body, at least one frangible plane between such at least one upper barrel body and such at least one lower barrel body, at least one water outlet chamber, extending from such at least one upper barrel body, and at least one water entry into such at least one water outlet chamber from such at least one upper barrel body; at least one water-flowable channel extending from within such at least one upper barrel body, through such at least one water entry, and through such at least one water outlet chamber; and at least one backflow preventer; wherein such at least one backflow preventer is adapted to assist prevention of backflow of water through such at least one entry; and wherein such at least one backflow preventer is located substantially adjacent such at least one water entry. Even further, it provides such a fire hydrant system wherein such at least one backflow preventer comprises at least one valve disc. Moreover, it provides such a fire hydrant system wherein such at least one valve disc of such at least one backflow preventer, when closed, is located adjacent such at least one water entry. Additionally, it provides such a fire hydrant system wherein such at least one water outlet chamber comprises at least one fire hose-connectable water outlet. Also, it provides such a fire hydrant system wherein such at least one water outlet chamber comprises at least two fire hose-connectable water outlets. In addition, it provides such a fire hydrant system wherein such at least fire two hose-connectable water outlets comprise water outlets adapted to at least two different fire hose diameters.

In accordance with another preferred embodiment hereof, this invention provides a fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, such fire hydrant system comprising, in combination: the at least one upper barrel body; at least one water outlet chamber, extending from such at least one upper barrel body, and at least one water entry into such at least one water outlet chamber from such at least one upper barrel body; wherein such at least one upper barrel body and such at least one water outlet chamber together comprise exactly one unitary-construction housing; at least one water-flowable channel extending from within such at least one upper barrel body, through such at least one water entry, and through such at least one water outlet chamber; and at least one backflow preventer situate within such exactly one unitary-construction housing; wherein such at least one backflow preventer is adapted to assist prevention of backflow of water through such at least one entry. And, it provides such a fire hydrant system wherein such at least one backflow preventer comprises at least one valve disc. Further, it provides such a fire hydrant system wherein such at least one valve disc of such at least one backflow preventer, when closed, is located adjacent such at least one water entry. Even further, it provides such a fire hydrant system wherein such at least one water outlet chamber comprises at least one fire hose-connectable water outlet. Moreover, it provides such a fire hydrant system wherein such at least one water outlet chamber comprises at least two fire hose-connectable water outlets. Additionally, it provides such a fire hydrant system wherein such at least two fire hose-connectable water outlets comprise water outlets adapted to at least two different fire hose diameters. Also, it provides such a fire hydrant system wherein such at least one backflow preventer is located adjacent such at least one water entry.

In accordance with another preferred embodiment hereof, this invention provides a fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, such fire hydrant system comprising, in combination: the at least one upper barrel body; at least one water outlet chamber, extending from such at least one upper barrel body, and at least one water entry into such at least one water outlet chamber from such at least one upper barrel body; wherein such at least one upper barrel body and such at least one water outlet chamber together comprise exactly one unitary-construction housing; at least one water-flowable channel extending from within such at least one upper barrel body, through such at least one water entry, and through such at least one water outlet chamber; and at least one backflow preventer situate within such exactly one unitary-construction housing; wherein such at least one backflow preventer is adapted to assist prevention of backflow of water through such at least one entry. In addition, it provides such a fire hydrant system wherein such at least one backflow preventer comprises at least one valve disc. And, it provides such a fire hydrant system wherein such at least one valve disc of such at least one backflow preventer, when closed, is located adjacent such at least one water entry. Further, it provides such a fire hydrant system wherein such at least one water outlet chamber comprises at least one fire hose-connectable water outlet. Even further, it provides such a fire hydrant system wherein such at least one water outlet chamber comprises at least two fire hose-connectable water outlets. Moreover, it provides such a fire hydrant system wherein such at least two fire hose-connectable water outlets comprise water outlets adapted to at least two different fire hose diameters. Additionally, it provides such a fire hydrant system wherein such at least one backflow preventer is located adjacent such at least one water entry.

In accordance with another preferred embodiment hereof, this invention provides a fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, such fire hydrant system comprising, in combination: the at least one upper barrel body; at least one water outlet chamber, extending from such at least one upper barrel body, and at least one water entry into such at least one water outlet chamber from such at least one upper barrel body; wherein such at least one upper barrel body and such at least one water outlet chamber together comprise at least one upper barrel structure; at least one water-flowable channel extending from within such at least one upper barrel body, through such at least one water entry, and through such at least one water outlet chamber; and at least one backflow preventer situate within such at least one upper barrel structure; wherein such at least one backflow preventer is adapted to assist prevention of backflow of water through such at least one entry. Also, it provides such a fire hydrant system wherein such at least one backflow preventer comprises at least one valve disc. In addition, it provides such a fire hydrant system wherein such at least one valve disc of such at least one backflow preventer, when closed, is located adjacent such at least one water entry. And, it provides such a fire hydrant system wherein such at least one water outlet chamber comprises at least one fire hose-connectable water outlet. Further, it provides such a fire hydrant system wherein such at least one water outlet chamber comprises at least two fire hose-connectable water outlets. Even further, it provides such a fire hydrant system wherein such at least two fire hose-connectable water outlets comprise water outlets adapted to at least two different fire hose diameters. Even further, it provides such a fire hydrant system wherein such at least one backflow preventer is located adjacent such at least one water entry.

In accordance with another preferred embodiment hereof, this invention provides at least one method, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, such at least one method comprising, in combination, the steps of: providing for identification of needs of at least one community potable-water system desiring fire-hydrant backflow-prevention protection; providing for manufacture of at least one upper barrel structure comprising at least one upper barrel body; at least one water outlet chamber, extending from such at least one upper barrel body, at least one water entry into such at least one water outlet chamber from such at least one upper barrel body, at least one water-flowable channel extending from within such at least one upper barrel body, through such at least one water entry, and through such at least one water outlet chamber, and at least one backflow preventer situate within such at least one upper barrel structure; wherein such at least one backflow preventer is adapted to assist prevention of backflow of water through such at least one entry; and providing for delivery of such at least one upper barrel structure, installable on the at least one lower barrel body, to such at least one community potable-water system. Even further, it provides such a method further comprising the step of installing such at least one upper barrel structure within such at least one community potable-water system.

In accordance with another preferred embodiment hereof, this invention provides a fire hose system relating to a fire hydrant system, relating to protecting the purity of potable water systems from contamination from fire hoses used with fire hydrants, comprising, in combination: at least one water conduit having at least one water entry site and at least one water exit site; wherein such at least one water entry site is adapted to be connected with at least one fire hydrant water exit; and wherein such at least one water exit site is adapted to be connected with at least one fire-fighting hose; and at least one backflow preventer located within such at least one water conduit; wherein such at least one backflow preventer comprises exactly one check valve.

DETAILED DESCRIPTION OF THE BEST MODE AND PREFERRED EMBODIMENTS OF THE INVENTION

Figure 1:
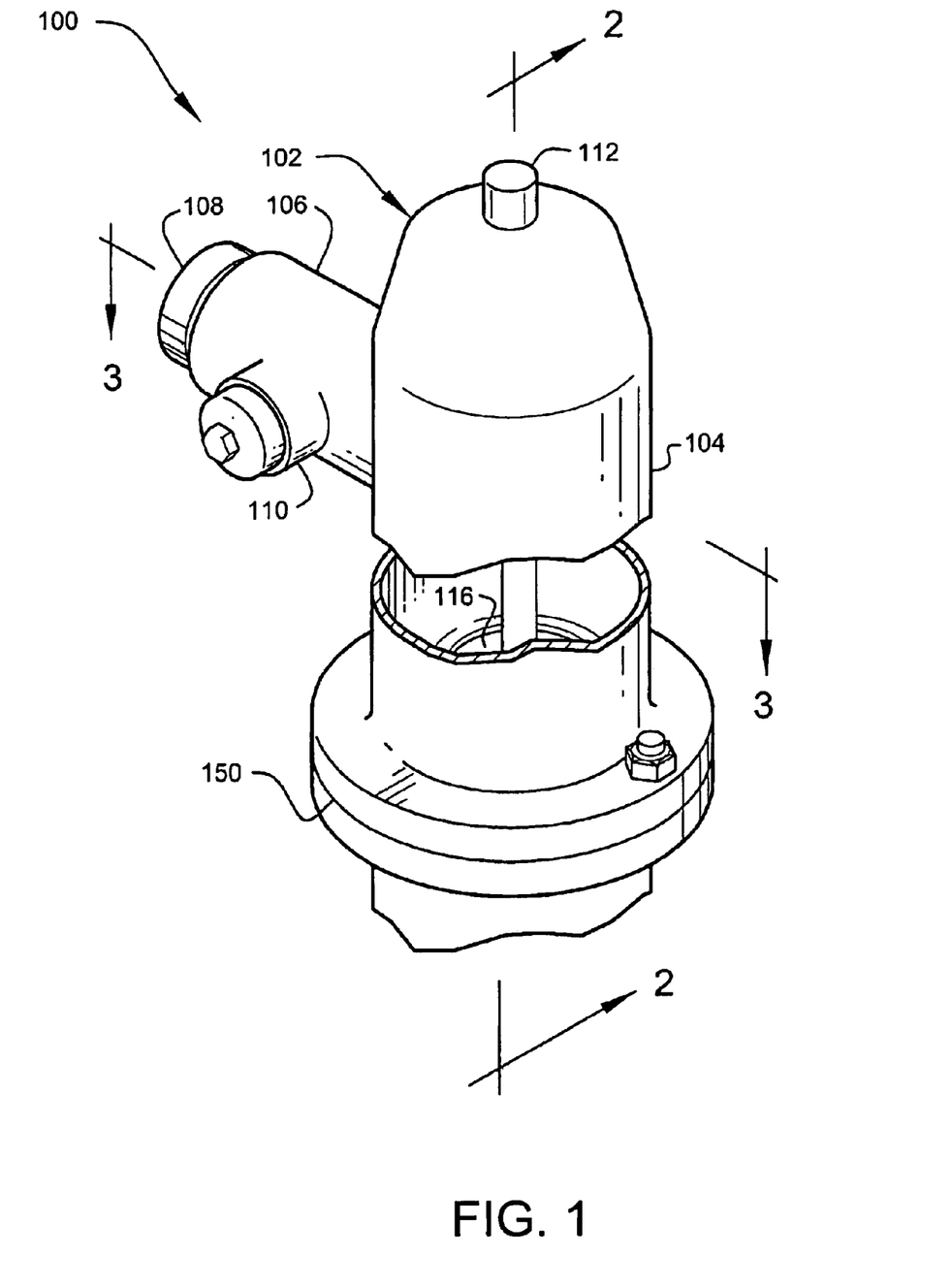
FIG. 1 shows a perspective view of a fire hydrant backflow prevention system according to a preferred embodiment of the present invention.

FIG. 1 shows a perspective view of fire hydrant backflow prevention system 100 according to a preferred embodiment of the present invention. Preferably, backflow prevention system 100 comprises barrel fire hydrant 102, as shown. Preferably, barrel fire hydrant 102 is a "dry barrel" fire hydrant, as shown. Preferably, barrel fire hydrant 102 comprises barrel body 104, as shown. Preferably, barrel fire hydrant 102 comprises outlet chamber 106 extending from barrel body 104, as shown. Preferably outlet chamber 106 (at least embodying herein at least one water outlet chamber, extending from said at least one upper barrel body) comprises discharge nozzle 108. Preferably discharge nozzle 108 (at least embodying herein wherein said at least one water outlet chamber comprises at least one fire hose-connectable water outlet) is adapted to connect to standard fire hoses. Preferably discharge nozzle 108 comprises removable nozzle cap 109 which helps prevent debris and other material from entering outlet chamber 106 through discharge nozzle 108 when discharge nozzle 108 is not being used. Preferably outlet chamber comprises at least one additional discharge nozzle 110 (at least embodying herein wherein said at least one water outlet chamber comprises at least two fire hose-connectable water outlets). Preferably, barrel fire hydrant 102 comprises one outlet chamber 106 with one main discharge nozzle 108 at the end and smaller additional nozzles 110 on the side, as shown (see FIG. 3). Preferably, main discharge nozzle 108 is about 4½ inches in diameter. Preferably, additional discharge nozzle 110 is about 2½ inches in diameter (at least embodying herein wherein said at least two hose-connectable water outlets comprise water outlets adapted to at least two different hose diameters). Preferably, barrel cavity 122 is about six inches in diameter. Preferably, outlet chamber 106 is about 5½ inches in diameter. Preferably discharge nozzle 110 comprises NST (National Standard Thread) threads or a "Storz" quick-connection to fit standard fire hoses. Preferably, outlet chamber 106 is integrally connected to barrel body 104. Preferably outlet chamber 106 and barrel body 104 comprise a unitary-construction housing (at least embodying herein wherein said at least one upper barrel body and said at least one water outlet chamber together comprise exactly one unitary-construction housing), as shown. Preferably, outlet chamber 106 and barrel body 104 are cast together and/or welded permanently together. Upon reading the teachings of this specification, those with ordinary skill in the art will now understand that, under appropriate circumstances, considering issues such as intended use, production cost, fire codes and regulations, etc., other fire hydrant arrangements may suffice, such as, for example, wet-barrel fire hydrants, other types of fire hydrants, other types of barrel bodies, other outlet arrangements, alternate discharge nozzle sizes and arrangements, alternate discharge nozzle threading arrangements, etc.

Figure 2:
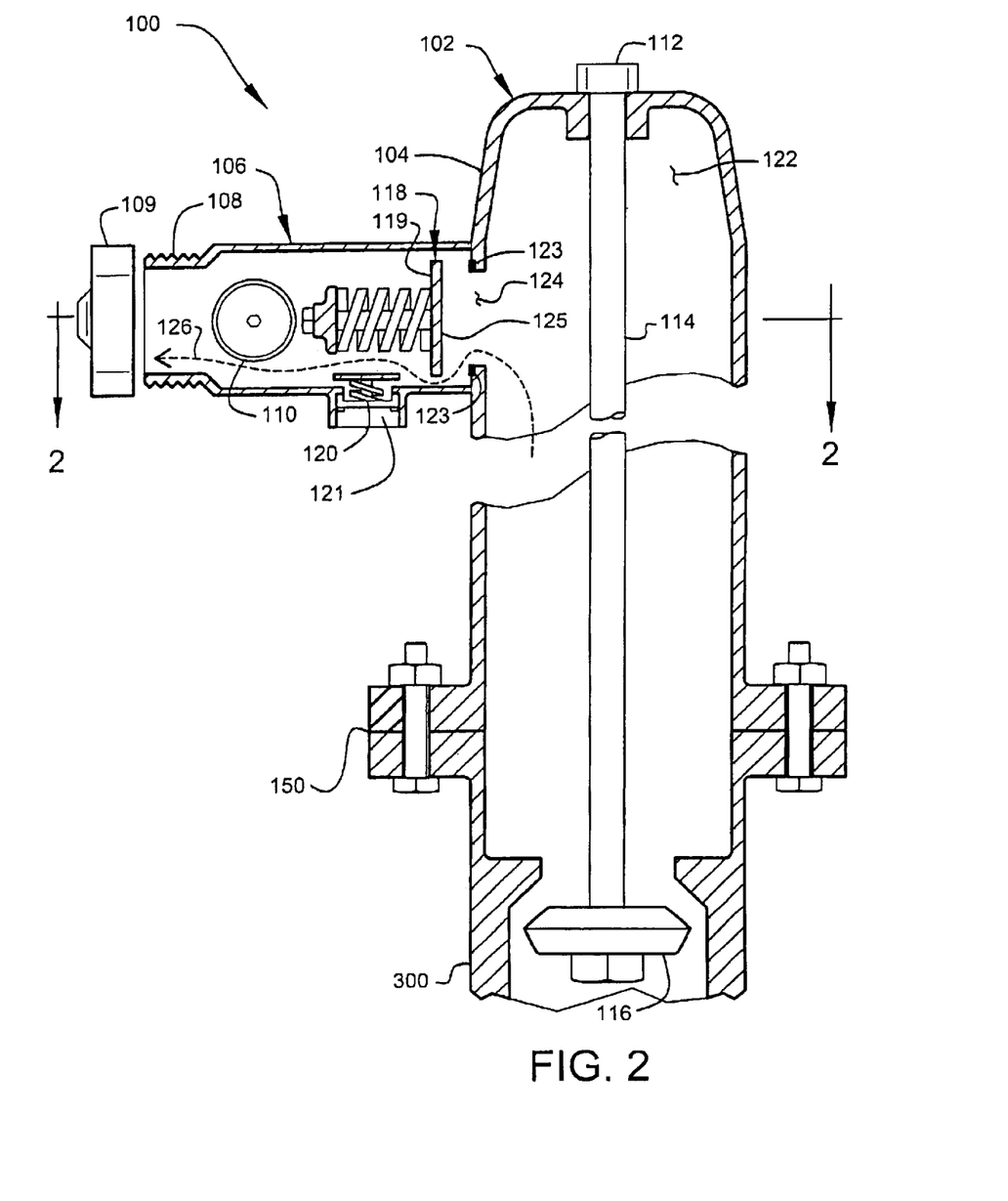
FIG. 2 shows a sectional view through section 2—2 of the fire hydrant backflow prevention system of FIG. 1.

FIG. 2 shows a sectional view through section 2—2 of the fire hydrant backflow prevention system of FIG. 1. Preferably barrel body 104 comprises barrel cavity 122, as shown. Preferably, barrel fire hydrant 102 comprises shut-off valve 116. Preferably shut-off valve 116 comprises shaft 114 and valve nut 112, for operating shut-off valve 116, as shown. Preferably, shut-off valve 116 is normally closed, and barrel cavity 122 is dry. Upon reading the teachings of this specification, those with ordinary skill in the art will now understand that, under appropriate circumstances, considering issues such as intended use, production cost, fire codes and regulations, etc., other shut-off valve arrangements may suffice, such as, for example, a shut-off valve for each outlet chamber 106 rather than shut-off valve for barrel cavity 122 (such as, for example, if used with a wet barrel fire hydrant, etc.), other types of shut-off valve, etc. Preferably, outlet chamber 106 comprises backflow prevention device 118 (at least embodying herein at least one backflow preventer situate within said exactly one unitary-construction housing). Preferably, backflow prevention device 118 comprises check valve 119, as shown. Preferably, to obtain water, a user operates shut-off valve by turning valve nut 112 which is connected to shut-off valve by shaft 114. Preferably, opening shut-off valve 116 allows pressurized water from potable water distribution system 300 (such as, for example, a municipal water main) to enter barrel cavity 122.

Preferably, pressurized water in barrel cavity opens backflow prevention device 118, enters outlet chamber 106 through chamber entry 124 (at least embodying herein at least one water entry into said at least one water outlet chamber from said at least one upper barrel body), and then exits through discharge nozzle 108 or discharge nozzle 110 as indicated by water flow channel 126 (at least embodying herein at least one water-flowable channel extending from within said at least one upper barrel body, through said at least one water entry, and through said at least one water outlet chamber), as shown. Preferably, check valve 119 is located in outlet chamber 106 adjacent to barrel body 104 at chamber entry 124 (at least embodying herein wherein said at least one backflow preventer is located adjacent said at least one water entry), as shown.

Preferably, check valve 119 (at least embodying herein wherein said at least one backflow preventer is adapted to assist prevention of backflow of water through said at least one entry) allows water from barrel cavity 122 to enter outlet chamber 106, and helps prevent water in outlet chamber 106 from entering barrel cavity 122. Preferably, check valve 119 is structured and arranged to minimize head loss of water passing through check valve 119. Preferably, check valve 119 is structured and arranged so that the water pressure in barrel cavity needs to be at least slightly greater [preferably about ½ pounds-per-square-inch ("psi") to about 3 psi] than the water pressure in chamber 106 to keep check valve 119 open. Preferably, check valve 119 is structured and arranged so that when water pressure in chamber 106 exceeds, or is equal to, the water pressure in barrel cavity 122, check valve 119 closes. Preferably, check valve 119 comprises valve disc 125 (at least embodying herein wherein said at least one backflow preventer comprises at least one valve disc). Preferably, check valve 119 comprises an internally loaded plunger-type valve that can tightly seal against a machined valve seat of chamber entry 124 (at least embodying herein wherein said at least one valve disc of said at least one backflow preventer, when closed, is located adjacent said at least one water entry), as shown. Preferably, valve disc 125 is about four inches in diameter. Preferably, valve disc 125 is made of Lexan to help prevent calcium build-up. Preferably valve disc 125 has a ½-inch overlap around chamber entry 124 and abuts rubber gasket 123 (adjacent barrel body 104) when closed, as shown. Upon reading the teachings of this specification, those with ordinary skill in the art will now understand that, under appropriate circumstances, considering issues such as intended use, production cost, fire codes and regulations, valve maintenance and reliability, valve head loss, etc., other backflow prevention device arrangements may suffice, such as, for example, other types of check valves, multiple check valves, backflow prevention devices other than check valves, locating backflow prevention device inside barrel body, etc.

Preferably, backflow prevention device 118 comprises relief valve 120, as shown. Preferably, relief valve 120 comprises relief valve outlet 121, as shown. Preferably relief valve 120 helps prevent water pressure in outlet chamber 106 from exceeding water pressure in barrel cavity 122. Preferably, relief valve 120 allows water in outlet chamber 106 to exit through relief valve outlet 121 when check valve is closed. Preferably, relief valve 120 helps reduce the risk of seepage backflow around disc when check valve 119 is closed. Preferably, relief valve 120 is normally open. Preferably, relief valve 120 closes when check valve 119 is open and water pressure in chamber is greater than about eight psi. Preferably relief valve 120 comprises a 1½-inch valve that operates on a reduced pressure method. Upon reading the teachings of this specification, those with ordinary skill in the art will now understand that, under appropriate circumstances, considering issues such as intended use, production cost, fire codes and regulations, valve maintenance and reliability, valve head loss, etc., other relief valve arrangements may suffice, such as, for example, other types of relief valves, multiple relief valves, relief valves that operate in a different manner, not having a relief valve, etc.

Preferably, barrel fire hydrant 102 is connected to potable water distribution system 300, as shown. Preferably, barrel fire hydrant 102 (at least embodying herein at least one upper barrel body) comprises frangible connection 150 (at least embodying herein at least one frangible plane between said at least one upper barrel body and said at least one lower barrel body), as shown, so that barrel fire hydrant 102 can break away (such as, for example, if barrel fire hydrant is hit by a car) from lower barrel body 300 (also called a standpipe). Preferably lower barrel body 300 is connected to a pressurized potable water distribution system. Preferably, frangible connection 150 fits standard barrel fire hydrant frangible connections so that barrel fire hydrant 102 can replace existing hydrants. Preferably, to help prevent backflow contamination of potable water distribution systems, municipalities replace old fire hydrants (that aren't equipped with backflow prevention) with barrel fire hydrant 102 by attaching barrel fire hydrant 102 to the lower barrel body of the old fire hydrant.

Preferably, a vendor identifies the needs of communities that would benefit from fire hydrant backflow prevention (such as, for example, from budgetary constraints, existing fire hydrants sizes and specifications, etc.). Preferably, vendor provides backflow prevention fire hydrant 102 adapted to replace existing fire hydrants in the community (for example, to fit existing lower barrel bodies of old fire hydrants and with nozzles of the appropriate size and threading type for the community, etc.), and for new installations. Preferably backflow prevention fire hydrants 102 replace existing fire hydrants according to a schedule consistent with the needs of the community (such as, for example, phased replacement scheduled over a period of time). Thus, it is noted that in accordance with another preferred embodiment hereof, this invention provides at least one method, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, such at least one method comprising, in combination, the steps of: providing for identification of needs of at least one community potable-water system desiring fire-hydrant backflow-prevention protection; providing for manufacture of at least one upper barrel structure comprising at least one upper barrel body; at least one water outlet chamber, extending from such at least one upper barrel body, at least one water entry into such at least one water outlet chamber from such at least one upper barrel body, at least one water-flowable channel extending from within such at least one upper barrel body, through such at least one water entry, and through such at least one water outlet chamber, and at least one backflow preventer situate within such at least one upper barrel structure; wherein such at least one backflow preventer is adapted to assist prevention of backflow of water through such at least one water entry; and providing for delivery of such at least one upper barrel structure, installable on the at least one lower barrel body, to such at least one community potable-water system. Even further, it provides such a method further comprising the step of installing such at least one upper barrel structure within such at least one community potable-water system.

Figure 3:
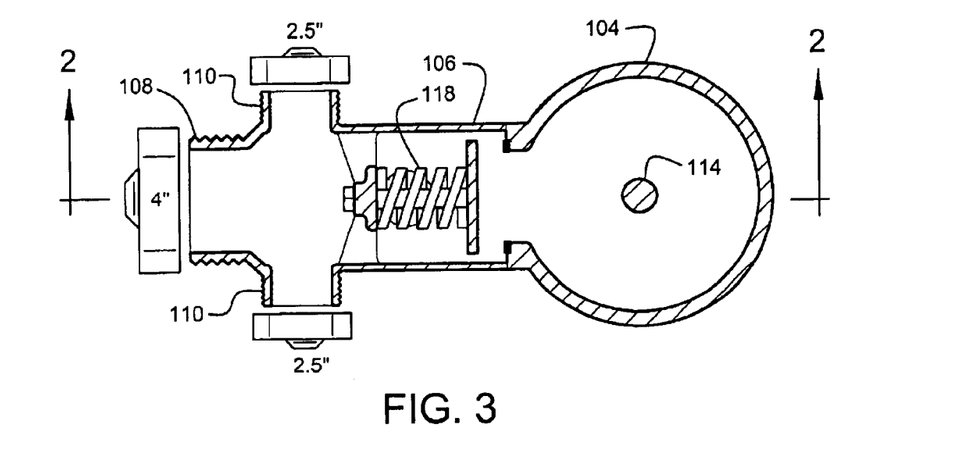
FIG. 3 shows a sectional view through section 3—3 of thee fire hydrant backflow prevention system of FIG. 1.

FIG. 3 shows a sectional view through section 3—3 of the fire hydrant backflow prevention system of FIG. 1. Preferably, one outlet chamber 106 with one backflow prevention device 118 are arranged to serve one discharge nozzle and at least one additional discharge nozzle 110, as shown.

Figure 4:
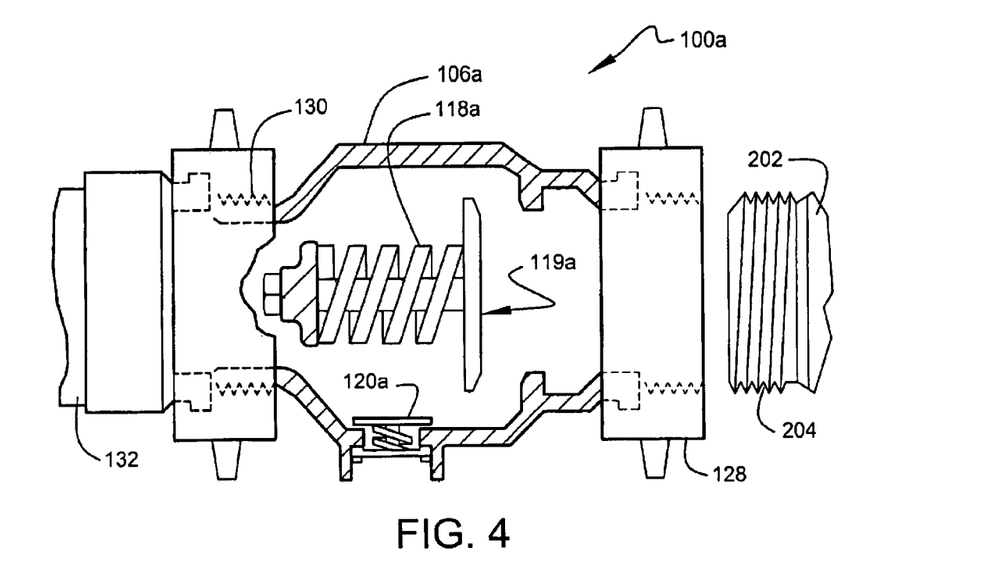
FIG. 4 shows a cutaway view of a fire hose backflow prevention system according to an alternate preferred embodiment of the present invention.

FIG. 4 shows a cutaway view of a fire hose backflow prevention system according to an alternate preferred embodiment of the present invention. Preferably, backflow prevention system 100a comprises chamber 106a, as shown. Preferably, chamber 106a, comprises backflow prevention device 118a (at least embodying herein at least one backflow preventer located within said at least one water conduit), as shown. Preferably, backflow prevention device 118a comprises check valve 119a (analogous to check valve 119 described above), as shown. Preferably, backflow prevention device 118a comprises relief valve 120a (analogous to check valve 120 described above), as shown. Preferably, backflow prevention device 118a comprises no more than one check valve 119a (at least embodying herein wherein said at least one backflow preventer comprises exactly one check valve) to keep size and weight, etc., manageable. Upon reading the teachings of this specification, those with ordinary skill in the art will now understand that, under appropriate circumstances, considering issues such as intended use, production cost, fire codes and regulations, valve maintenance and reliability, valve head loss, etc., other backflow prevention device arrangements may suffice, such as, for example, other types of check valves, multiple check valves, backflow prevention devices other than check valves, etc.

Preferably, backflow prevention system 100a comprises connector 130 adapted to connect to fire hose 132 (at least embodying herein wherein said at least one water exit site is adapted to be connected with at least one fire-fighting hose), as shown. Preferably connector 130 comprises NST threads or a "Storz" quick-connection so that a fire hose can be attached to the discharge nozzle of chamber 106a, as shown. Preferably, fire fighters leave backflow prevention system 100a permanently attached to fire hose 132, as shown. Preferably, backflow prevention system 100a is only removed from fire hose 132 when repairs or replacement of fire hose 132 and/or backflow prevention system 100a are necessary. Preferably, backflow prevention system 100a comprises attacher 128 adapted to attach to a fire hydrant 202 (at least embodying herein wherein said at least one water entry site is adapted to be connected with at least one fire hydrant water exit), as shown. Preferably attacher 128 comprises swivel collar with lugs, as shown, to attach to NST threads or a "Storz" quick-connection of a discharge nozzle 204 of a fire hydrant 202, as shown. Upon reading the teachings of this specification, those with ordinary skill in the art will now understand that, under appropriate circumstances, considering issues such as intended use, production cost, fire codes and regulations, types of fire hydrants, etc., other connector and attacher arrangements may suffice, such as, for example, different types of connectors, different types of threading, having backflow prevention system 100a integrally connected to fire hose 132, etc.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A fire hydrant system, relating to protecting the purity of potable water systems from contamination from frangible-barrel-fire-hydrant use, comprising, in combination:
    a) at least one frangible barrel fire hydrant comprising
        i) at least one upper barrel body
        ii) at least one lower barrel body,
        iii) at least one frangible plane between said at least one upper barrel body and said at least one lower barrel body,
        iv) at least one water outlet chamber, extending from said at least one upper barrel body, and
        v) at least one water entry into said at least one water outlet chamber from said at least one upper barrel body;
    b) wherein said at least one upper barrel body and said at least one water outlet chamber together comprise exactly one unitary-construction housing;
    c) at least one water-flowable channel extending from within said at least one upper barrel body, through said at least one water entry, and through said at least one water outlet chamber; and
    d) at least one backflow preventer situate within said exactly one unitary-construction housing;
    e) wherein said at least one backflow preventer is adapted to assist prevention of backflow of water through said at least one entry.

2. The fire hydrant system according to claim 1 wherein said at least one backflow preventer comprises at least one valve disc.

3. The fire hydrant system according to claim 2 wherein said at least one valve disc of said at least one backflow preventer, when closed, is located adjacent said at least one water entry.

4. The fire hydrant system according to claim 1 wherein said at least one water outlet chamber comprises at least one fire hose connectable water outlet.

5. The fire hydrant system according to claim 4 wherein said at least one water outlet chamber comprises at least two fire hose connectable water outlets.

6. The fire hydrant system according to claim 5 wherein said at least two hose connectable water outlets comprise water outlets adapted to at least two different hose diameters.

7. The fire hydrant system according to claim 1 wherein said at least one backflow preventer is located adjacent said at least one water entry.

8. A fire hydrant system, relating to protecting the purity of potable water systems from contamination from frangible-barrel-fire-hydrant use, comprising, in combination:
    a) at least one frangible barrel fire hydrant comprising
        i) at least one upper barrel body
        ii) at least one lower barrel body,
        iii) at least one frangible plane between said at least one upper barrel body and said at least one lower barrel body,
        iv) at least one water outlet chamber, extending from said at least one upper barrel body, and
    b) at least one water entry into said at least one water outlet chamber from said at least one upper barrel body;

c) at least one water-flowable channel extending from within said at least one upper barrel body, through said at least one water entry, and through said at least one water outlet chamber; and d) at least one backflow preventer;

e) wherein said at least one backflow preventer is adapted to assist prevention of backflow of water through said at least one entry; and f) wherein said at least one backflow preventer is located substantially adjacent said at least one water entry.

9. The fire hydrant system according to claim 8 wherein said at least one backflow preventer comprises at least one valve disc.

10. The fire hydrant system according to claim 9 wherein said at least one valve disc of said at least one backflow preventer, when closed, is located adjacent said at least one water entry.

11. The fire hydrant system according to claim 8 wherein said at least one water outlet chamber comprises at least one fire hose connectable water outlet.

12. The fire hydrant system according to claim 11 wherein said at least one water outlet chamber comprises at least two fire hose connectable water outlets.

13. The fire hydrant system according to claim 12 wherein said at least fire two hose connectable water outlets comprise water outlets adapted to at least two different fire hose diameters.

14. A fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, said fire hydrant system comprising, in combination:

a) the at least one upper barrel body;

b) at least one water outlet chamber, extending from said at least one upper barrel body, and c) at least one water entry into said at least one water outlet chamber from said at least one upper barrel body;

d) wherein said at least one upper barrel body and said at least one water outlet chamber together comprise exactly one unitary-construction housing;

e) at least one water-flowable channel extending from within said at least one upper barrel body, through said at least one water entry, and through said at least one water outlet chamber; and f) at least one backflow preventer situate within said exactly one unitary-construction housing;

g) wherein said at least one backflow preventer is adapted to assist prevention of backflow of water through said at least one entry.

15. The fire hydrant system according to claim 14 wherein said at least one backflow preventer comprises at least one valve disc.

16. The fire hydrant system according to claim 15 wherein said at least one valve disc of said at least one backflow preventer, when closed, is located adjacent said at least one water entry.

17. The fire hydrant system according to claim 14 wherein said at least one water outlet chamber comprises at least one fire hose connectable water outlet.

18. The fire hydrant system according to claim 17 wherein said at least one water outlet chamber comprises at least two fire hose connectable water outlets.

19. The fire hydrant system according to claim 18 wherein said at least two fire hose connectable water outlets comprise water outlets adapted to at least two different fire hose diameters.

20. The fire hydrant system according to claim 14 wherein said at least one backflow preventer is located adjacent said at least one water entry.

21. A fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, said fire hydrant system comprising, in combination:

a) the at least one upper barrel body;

b) at least one water outlet chamber, extending from said at least one upper barrel body, and c) at least one water entry into said at least one water outlet chamber from said at least one upper barrel body;

d) wherein said at least one upper barrel body and said at least one water outlet chamber together comprise exactly one unitary-construction housing;

e) at least one water-flowable channel extending from within said at least one upper barrel body, through said at least one water entry, and through said at least one water outlet chamber; and f) at least one backflow preventer situate within said exactly one unitary-construction housing;

g) wherein said at least one backflow preventer is adapted to assist prevention of backflow of water through said at least one entry.

22. The fire hydrant system according to claim 21 wherein said at least one backflow preventer comprises at least one valve disc.

23. The fire hydrant system according to claim 22 wherein said at least one valve disc of said at least one backflow preventer, when closed, is located adjacent said at least one water entry.

24. The fire hydrant system according to claim 21 wherein said at least one water outlet chamber comprises at least one fire hose connectable water outlet.

25. The fire hydrant system according to claim 24 wherein said at least one water outlet chamber comprises at least two fire hose connectable water outlets.

26. The fire hydrant system according to claim 25 wherein said at least two fire hose connectable water outlets comprise water outlets adapted to at least two different fire hose diameters.

27. The fire hydrant system according to claim 21 wherein said at least one backflow preventer is located adjacent said at least one water entry.

28. A fire hydrant system, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, said fire hydrant system comprising, in combination:

a) the at least one upper barrel body;

b) at least one water outlet chamber, extending from said at least one upper barrel body, and c) at least one water entry into said at least one water outlet chamber from said at least one upper barrel body;

d) wherein said at least one upper barrel body and said at least one water outlet chamber together comprise at least one upper barrel structure;

e) at least one water-flowable channel extending from within said at least one upper barrel body, through said at least one water entry, and through said at least one water outlet chamber; and f) at least one backflow preventer situate within said at least one upper barrel structure;

g) wherein said at least one backflow preventer is adapted to assist prevention of backflow of water through said at least one entry.

29. The fire hydrant system according to claim 28 wherein said at least one backflow preventer comprises at least one valve disc.

30. The fire hydrant system according to claim 29 wherein said at least one valve disc of said at least one backflow preventer, when closed, is located adjacent said at least one water entry.

31. The fire hydrant system according to claim 28 wherein said at least one water outlet chamber comprises at least one fire hose connectable water outlet.

32. The fire hydrant system according to claim 31 wherein said at least one water outlet chamber comprises at least two fire hose connectable water outlets.

33. The fire hydrant system according to claim 32 wherein said at least two fire hose connectable water outlets comprise water outlets adapted to at least two different fire hose diameters.

34. The fire hydrant system according to claim 28 wherein said at least one backflow preventer is located adjacent said at least one water entry.

35. At least one method, relating to protecting the purity of potable water systems from contamination from use of at least one frangible barrel fire hydrant having at least one upper barrel body, at least one lower barrel body, and at least one frangible plane between the at least one upper barrel body and the at least one lower barrel body, said at least one method comprising, in combination, the steps of:

a) providing for identification of needs of at least one community potable-water system desiring fire-hydrant backflow-prevention protection;

b) providing for manufacture of at least one upper barrel structure comprising
   i) at least one upper barrel body;
   ii) at least one water outlet chamber, extending from such at least one upper barrel body,
   iii) at least one water entry into such at least one water outlet chamber from such at least one upper barrel body,
   iv) at least one water-flowable channel extending from within such at least one upper barrel body, through such at least one water entry, and through such at least one water outlet chamber, and
   v) at least one backflow preventer situate within such at least one upper barrel structure;
   vi) wherein such at least one backflow preventer is adapted to assist prevention of backflow of water through such at least one entry; and c) providing for delivery of such at least one upper barrel structure, installable on the at least one lower barrel body, to such at least one community potable-water system.

36. The method according to claim 35 further comprising the step of installing such at least one upper barrel structure within such at least one community potable-water system.

* * * * *